United States Patent [19]

Keller, III

[11] 4,301,830
[45] Nov. 24, 1981

[54] FRICTIONAL CONTROL OF A SINGLE LEVER FAUCET CONSTRUCTION

[75] Inventor: Robert J. Keller, III, Richmond, Va.

[73] Assignee: KEL-WIN Manufacturing Company, Inc., Chester, Va.

[21] Appl. No.: 155,968

[22] Filed: Jun. 3, 1980

[51] Int. Cl.³ ................ F16K 25/00; F16K 31/524
[52] U.S. Cl. .................... 137/454.6; 137/636.1; 137/607; 251/263; 251/297
[58] Field of Search ............ 137/454.6, 315, 119, 137/607, 636, 636.1, 636.2; 251/251, 252, 263, 297

[56] References Cited

U.S. PATENT DOCUMENTS

| | | | |
|---|---|---|---|
| 1,167,959 | 1/1916 | Wiechert | 137/636.1 |
| 2,035,202 | 3/1936 | Smith | 251/263 |
| 3,037,520 | 6/1962 | Thomas | 251/252 |
| 3,184,214 | 5/1965 | King | 251/252 |
| 3,369,566 | 2/1968 | Schmitt et al. | 137/636.1 |
| 3,384,121 | 5/1968 | Spencer | 137/636.1 |
| 3,812,875 | 5/1974 | Buhler | 137/636.1 |
| 3,952,764 | 4/1976 | Keller | 137/636.1 |
| 4,051,869 | 10/1977 | Holt et al. | 137/636.1 |
| 4,220,175 | 9/1980 | Keller et al. | 137/607 |

Primary Examiner—Martin P. Schwadron
Assistant Examiner—G. L. Walton
Attorney, Agent, or Firm—Richard P. Matthews

[57] ABSTRACT

A frictional control for a single lever faucet construction wherein a compensating cam follower member is made from a material having a higher coefficient of friction than that used for two cam followers which actuate valve members effecting mixing of hot and cold water. All of the cam followers are under the control of a single ball cam member. The cam followers which actuate the valve members have convex surfaces to establish substantially point contact with the ball cam member while the compensating cam follower has a concave surface to engage a substantially larger, and preferably spherical, area of the ball cam member.

8 Claims, 10 Drawing Figures

FRICTIONAL CONTROL OF A SINGLE LEVER FAUCET CONSTRUCTION

This invention relates to a single lever faucet construction and, more particularly, to an improved frictional control for the ball cam which is actuated by the operating or control handle.

As is more fully disclosed in my issued U.S. Pat. No. 3,952,764 for a single lever faucet construction, issued Apr. 27, 1976, it is desirable to be able to provide an operating force balance on the control handle of a single lever faucet. Such a force balance gives the user a feel for the position of the control handle and permits the user to blend the water emanating from the hot and cold water supplies more reliably. To this end, a compensating or false cam follower member is used which is engageable with a ball cam member along with two other cam follower members whose position directly affects the mixing or blending of hot and cold water and the rate of flow from the spout.

It has been found that with the use of a single ball cam member engageable with all three cam follower members that a trade off or compromise had to be made in the desire to provide on the one hand a long wearing characteristic for the ball cam member and cam follower members and, on the other hand, the desired feel between the compensating or false cam member so that a steady or smooth movement of the control handle was achieved without the tendency to snap into a fully closed position. To achieve a long wearing characteristic, a low coefficient friction between parts is desired; but to achieve a steady and smooth movement of the control handle, a relatively high coefficient of friction between parts is desired.

Another problem encountered in the positional control of the operating or controlling of the lever is the amount of contact permitted between the ball cam member and the cam follower members. In my U.S. Pat. No. 3,952,764 convex cam follower members are used throughout which maintain only point contact with the ball cam member. Once again, this construction is advantageous for long wearing characteristics, but it does not enhance or provide the most desirable smooth translational movement of the control handle.

The foregoing problems and limitations of my previously known device have been effectively overcome in accordance with the present invention wherein a material is used at least for that portion of the compensating or false cam member engageable with the ball cam member which has a higher coefficient of friction than the coefficient of friction of either of the other two cam followers individually so as to produce a frictional force by the compensating cam member greater than the frictional force from the other two cam followers. In addition, a concave, and preferably spherical, surface is provided on the compensating or false cam member which is engageable with a complementary spherical surface on the ball cam member. Not only does this construction provide an improved smooth translational movement of the operating handle, but also it makes the manufacture of the ball cam member less complex. In a preferred form of the invention, the compensating cam follower member is provided with an insert which mates with ball cam member with this insert being replaceable so that it may be replaced in the event of excessive wear. Other improvements made in the present invention include a more efficient and long wearing mounting structure for the ball cam member and an alteration in the opening provided by the ball cam retainer member so that greater control of the temperature of the water delivered by the faucet is achieved at low flow rates.

The inherent advantages and improvements of the present invention will become more readily apparent upon reference to the following detailed description of the invention and by reference to the drawings in which.

Figure 1:
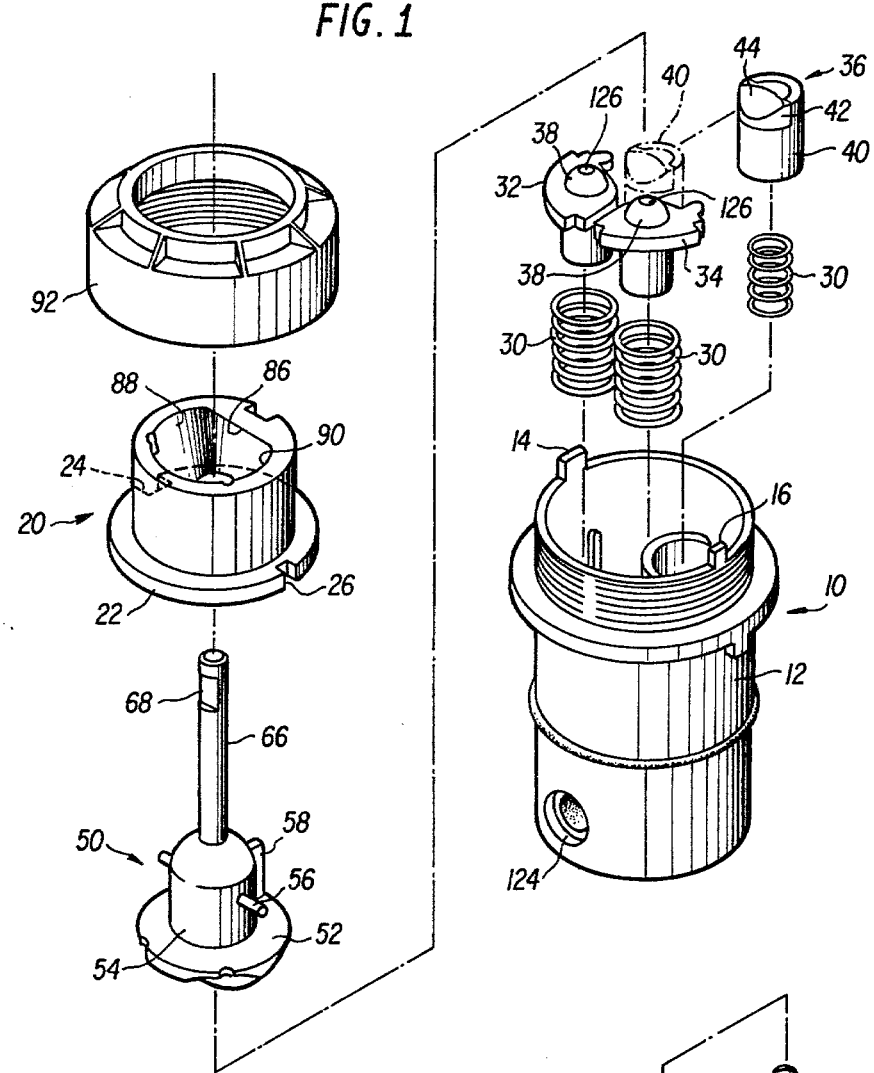
FIG. 1 is an exploded perspective view of a cartridge construction for use with a single lever faucet embodying my invention.

Referring now to FIG. 1 of the drawings, there is illustrated a removable cartridge designated generally at 10. This cartridge is identical with the cartridge shown in my U.S. Pat. No. 3,952,764, the disclosure of which is hereby incorporated by reference. Cartridge 10 is shown to have a cylindrical wall 12 together with a number of means for orienting various component parts with respect to the cartridge during assembly operations. These orienting means include upstanding orienting tabs 14 and 16 shown in FIG. 1 to possess widths of different sizes so that a ball cam retainer indicated at 20 in FIG. 1 will be properly oriented with respect thereto. The ball cam retaining member 20 has a bottom annular flange 22 which is provided with mating orienting slots 24, 26 which are appropriately sized to mate respectively with tabs 14, 16 on the removable cartridge 10.

Figure 9:
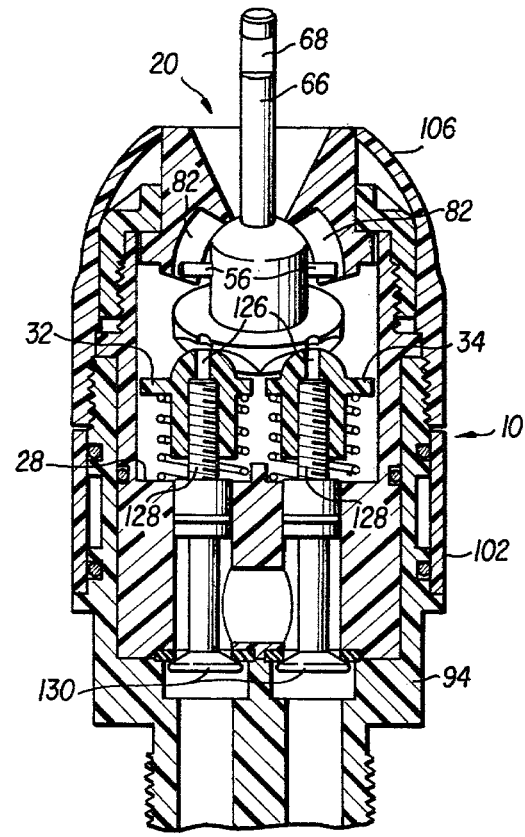
FIG. 9 is a side elevational view taken in vertical cross section similar to FIG. 8 with cartridge rotated 90 degrees.

The cartridge 10 has an internal platform 28, such as is indicated in FIG. 9, to provide a horizontal support for a set of three springs 30 which urge their associated cam follower members 32, 34 and a compensating cam follower, indicated generally at 36, all upwardly into engagement with a ball cam, indicated generally at 50. Each of the first and second cam followers 32, 34 have a convex cam follower surface 38 so as to maintain substantially point contact with the ball cam member 50. The springs 30 provide a force loading on the ball cam 50 and provide balance for it. In order to minimize the undesirable tendency of having the handle snap into its closed position as the handle of the faucet approaches the closed position, the springs 30 for the cam followers may be made weaker than the spring for the compensating cam follower 36. One way to achieve weaker springs is to use a smaller diameter for the spring wire.

The compensating cam follower 36 has a hollow cylindrical wall 40 at the top of which is received an insert 42 having a concave, and preferably spherical, surface 44 for engagement with a complementary spherical surface on the ball cam member 50, as will be explained more fully hereinafter.

Figure 2:
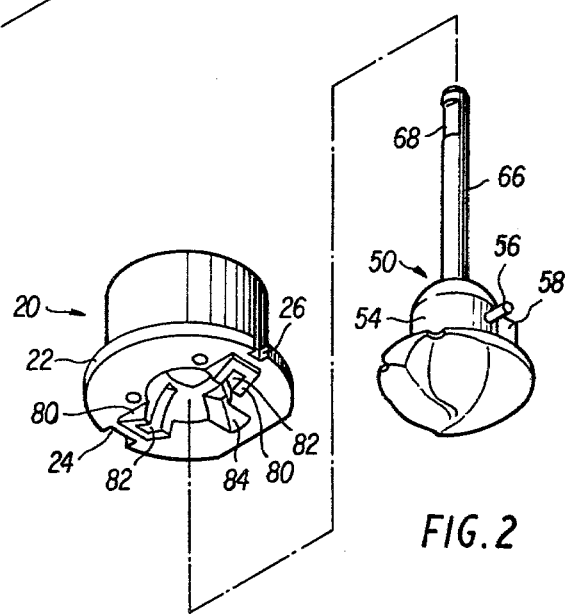
FIG. 2 is an exploded perspective view showing the bottom of the ball cam member and the ball cam retainer of FIG. 1.
Figure 3:
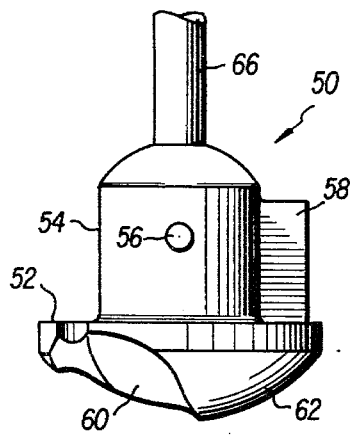
FIG. 3 is a fragmentary side elevational view of the ball cam member of FIG. 1 drawn to an enlarged scale.
Figure 4:
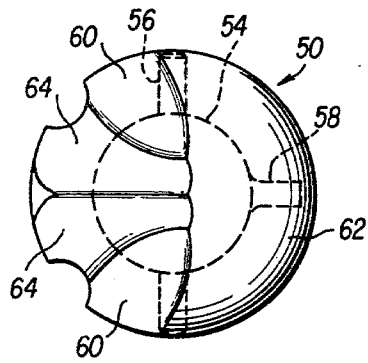
FIG. 4 is a bottom plan view of the ball cam member of FIG. 3.

As is best seen in FIGS. 2-4, the ball cam 50 has a base 52 above which extends a cylindrical hub 54. A pin 56 extends transversely through the cylindrical hub 54 to provide an axis of rotation for the ball cam 50. Orienting means 58 in the form of a protruding bar or plug extends outwardly from the cylindrical hub 54. On the bottom of the ball cam member, a cam surface is provided at 60 which controls the vertical position of the first and second cam followers 32, 34 by engagement therewith. In addition, ball cam 50 has a convexly spherical surface 62 which constantly engages the concavely spherical surface 44 on the insert 42 of the compensating or false cam 36. Not only does this provide greater friction and thereby steadier and smoother control because of the vastly greater area of contact than in my previous patent but also the material of the insert 42 is selected to have greater friction with the material of the ball cam than that provided by either of the cam followers 32, 34. A pair of detents 64 are provided to permit the insertion of an Allen wrench to adjust the clearance between the top of the cam followers and the working surface of the ball cam member 50 and thereby obtain proper opening and closing of the valve stems under the actuation of the ball cam member 50. The latter has an upwardly extending control lever member 66 with a slot provided therein at 68 for purposes of attaching a handle thereto.

As seen best in FIG. 2, the ball cam retainer 20 has a bearing support 80 for the transverse pin 56 at the ball cam member 50. With the bearing support 80 defining opposed slots 82 for reception of the pin 56 therein. Similarly, the ball cam retainer 20 has a notched recess or slot for the orienting means 58 of the ball cam member 50. Thus, it is possible for the ball cam member with its transversely extending pin 56 to be cradled within the slot 82 of the ball cam retaining member 20.

Figure 5:
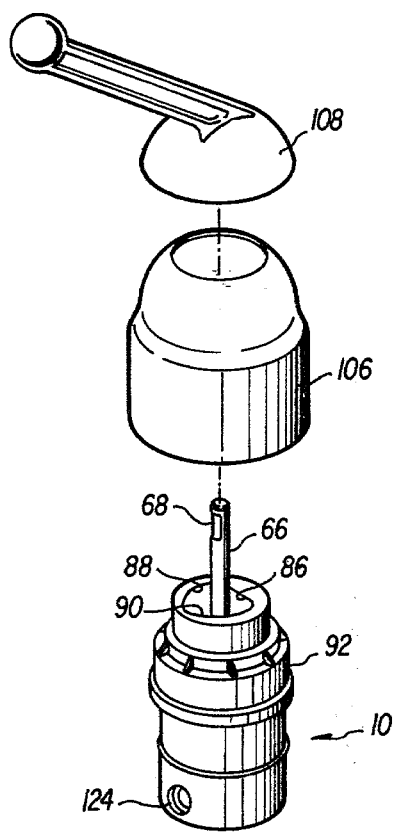
FIG. 5 is an exploded perspective view of a single lever faucet using the cartridge of FIG. 1.
Figure 5:
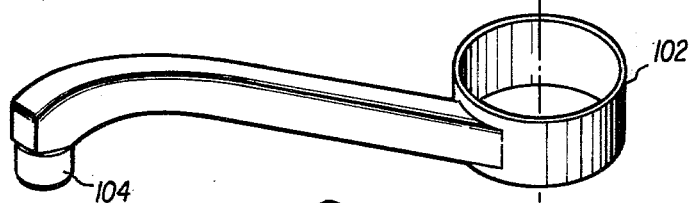
Figure 5:
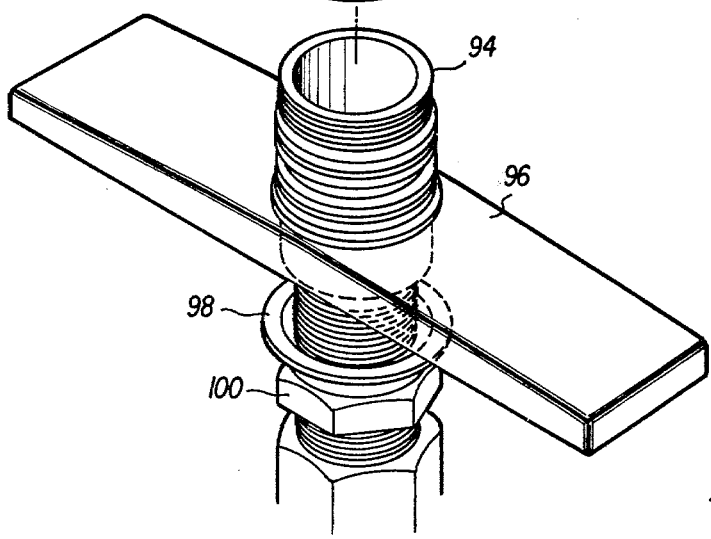
Figure 6:
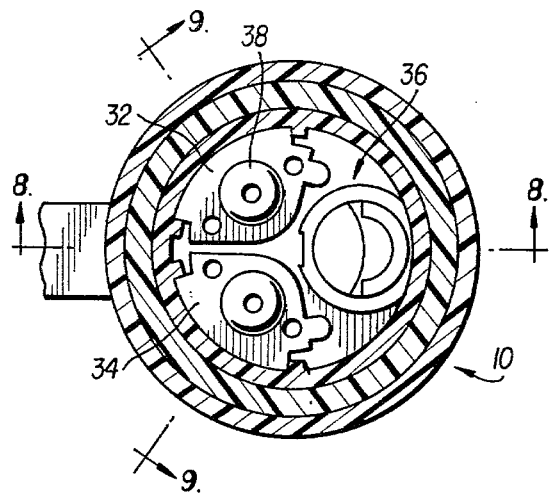
FIG. 6 is a top plan view taken in horizontal cross section of the cartridge of FIG. 1 with a ball cam member and retainer members removed.

The ball cam retainer 20 has a top opening which defines the metes and bounds for the control lever member 66. At the upper surface of ball cam retainer 20 this opening is defined by a chord-like side 86 and two remaining sides which are outwardly curved or outwardly bulged at 88 and 90 coming to a generally pointed triangular apex as best seen in FIG. 5. Thus, the opening is generally triangularly shaped but the sides 88 and 90 by being outwardly bulged permit more accurate temperature control by permitting greater movement per degree of temperature change in the low flow range. The pin eliminates the twisting of the ball cam within the cam retainer and maintains the relationship of the ball cam to the working surfaces on both cam followers 32, 34 and false cam 36. An inner cap, which is internally threaded, is shown at 92.

Figure 10:
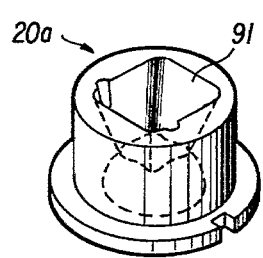
FIG. 10 is a perspective view of a modified ball cam retaining member.

As an alternative to the triangularly-shaped opening just described, the opening for the control lever member 66 may be substantially rectangular as is illustrated in FIG. 10 at 91 of a modified ball cam retaining member 20a. In the previously disclosed embodiment of U.S. Pat. No. 3,952,764, a wobble or undesired movement was experienced at the control lever because in the closed positions the cam followers for the hot and cold valve members drop out of contact with the ball cam member and the frictional force previously supplied by the compensating cam member was not sufficient to hold the control lever member 66 steady.

In accordance with the present invention, the frictional force provided by the compensating or false cam 36 is sufficient in and of itself to hold the control lever member 66 steady. The rectangularly-shaped opening 91 is an advantage because lateral motion of the control lever member 66 provides temperature control whereas front to back motion provides volume control. The converging sides of a triangularly-shaped opening permit progressively less temperature control as the control lever member approaches the off position.

Referring now to FIG. 5 of the drawings, an underbody member 94 is shown which is attachable to a plastic cover or other escutcheon-like member 96 with the aid of a crayfoot washer as shown more completely in U.S. Pat. No. 3,952,764 having an integral flange 98 urged into contact beneath the plastic cover 96 with the aid of lock nut 100. A spout 102 having a spigot means in the form of a spigot member 104 at its outer end is slipped over and supported by the underbody member 94 in the manner shown in FIGS. 8 and 9. Also, in FIG. 5 an outer cap or decorative cover is shown at 106 and a handle 108 or other actuating member suitably attached by slot 68 of the control lever 66.

Figure 7:
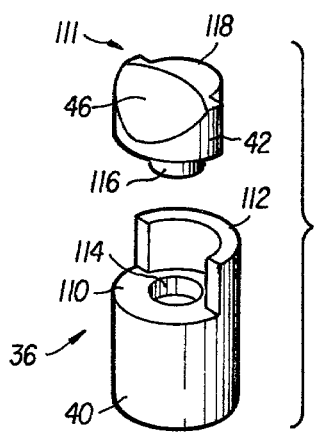
FIG. 7 is an exploded perspective view of the compensating cam follower member illustrated in FIG. 1.

Referring now to FIG. 7, the compensating cam or false cam member 36 is shown to have a shoulder seat for the insert member shown thereabove, and indicated generally at 111 in FIG. 7. The compensating cam member 36 is shown to have a semicircular cylindrical surface 112 extending above the shoulder seat 110 and an opening 114 through the shoulder set 110. The insert 111 has a cylindrical attaching plug 116 which is received in opening 114. Insert 111 also has a hemispherical surface 118 received within the semicircular cylindrical surface 112 of the compensating cam follower 36.

Figure 8:
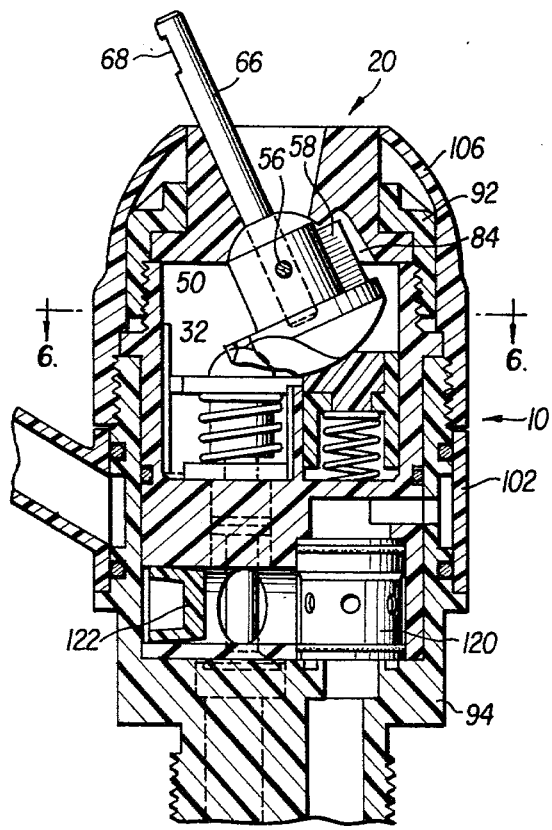
FIG. 8 is a side elevational view taken in vertical cross section of a completely assembled cartridge.

In the assembled view illustrated in FIGS. 8 and 9, a diverter valve 120 is shown in position within the cartridge and a plug member 122 inserted in aperture 124 (FIG. 1). Cam followers 32, 34 are shown provided with apertures 126 through which an Allen wrench may be extended into an opening therefor in the threaded ends 128 of the valve stem members. The valves are shown to be in their closed or off position in each of FIGS. 8 and 9. The operation of the control lever is the same as that disclosed in the aforesaid U.S. Pat. No. 3,952,764.

By way of example only of materials used for the ball cam member 50, the cam followers 32, 34 with a low coefficient of friction with the ball cam member 50, and false cam 36 with a relatively high coefficient of friction for the ball cam member 50, the following illustrations are given. One suitable material composition for the ball cam member 50 is to make it from 80% Celcon which is an acetal copolymer manufactured by Celanese Plastics Company of Newark, N.J. and 20% Teflon which is a polytetrafluoroethylene supplied by E. I. Du Pont de Nemours of Wilmington, Del. One suitable material composition for the cam followers 32, 34 is a 33% glass filled 6/12 nylon also supplied by E. I. Du Pont de Nemours. A number of materials have been used successfully for the insert material 42 of false cam 36. For example, low density polyethylene has a higher coefficient of friction than the described material for the cam followers 32, 34 and is presently preferred. However, polyurethane has also been used successfully, but it does not wear so well as low density polyethylene. This invention is not limited to the selection of any particular materials since many combinations will satisfy the prescribed teaching herein.

While a presently preferred embodiment of the invention has been illustrated and described, it will be recognized that the invention may be otherwise variously embodied and practiced within the scope of the claims which follow.

What is claimed is:

1. A single lever faucet construction of the type having
   a. an underbody member;
   b. a removable cartridge member at least partially received in a socket of the underbody member;
   c. cartridge retaining means, with said cartridge member comprising
      (1) a housing member,
      (2) a ball cam member for substantially universal motion about a pair of intersecting axes,
      (3) stem means for moving said ball cam member about said pair of intersecting axes,
      (4) a pair of valve members actuated by an associated pair of cam follower members with said valve members communicating with sources of hot and cold water and a spigot, a third cam follower member being constantly in engagement with said ball cam member and serving to counterbalance the forces on said ball cam member by said associated pair of cam follower members and to prevent an inadvertent change of position of said ball cam member,
      (5) a ball cam retaining member; and
   d. spigot means in fluid communication with a mixing chamber means which is located downstream from and in fluid communication with said pair of valve members, the improvement which comprises providing a concave working surface on the third cam follower member which mates with a convex working surface on said ball cam member having a higher coefficient of friction than the coefficient of friction of either of the other two cam followers individually producing a frictional force by said third cam follower greater than the frictional force from the other two cam followers,
      (1) wherein said third cam follower produces a frictional force sufficiently large so that it alone is sufficient to hold said stem means from wobbling.

2. A single lever faucet construction as defined in claim 1 wherein said concave surface on the third cam follower member and said convex surface on the ball cam member are each spherical.

3. A single lever faucet construction as defined in claim 2 wherein the concave spherical working surface on the third cam follower member is made from low density polyethylene.

4. A single lever faucet construction as defined in claim 1 wherein the concave surface having a high coefficient of friction on said third cam follower member is a portion of an insert atop the third cam follower member.

5. A single lever faucet construction as defined in claim 1 wherein said ball cam member has a hub portion adjacent its cam surface and said stem portion carries a pin member extending through said hub portion and cradled within a slotted portion of said ball cam retaining member.

6. A single lever faucet construction as defined in claim 1 wherein said ball cam retaining member presents a generally triangular upper opening for said stem means which extends through said ball cam retaining member with the sides of said generally triangular upper opening being curved and outwardly bulged to permit a guided non-linear movement of said stem means.

7. A single lever faucet construction as defined in claim 1 wherein said pair of cam follower members have springs for urging said cam follower members into engagement with said ball cam member with each of said springs being weaker than a similarly functioning spring in engagement with said third cam follower member.

8. A single lever faucet construction as defined in claim 1 wherein said ball cam retaining member presents a generally rectangular upper opening for said stem means which extends therethrough.

* * * * *